(12) United States Patent
Nagashima

(10) Patent No.: US 11,841,435 B2
(45) Date of Patent: Dec. 12, 2023

(54) OBJECT IDENTIFICATION SYSTEM

(71) Applicant: KOITO MANUFACTURING CO., LTD., Tokyo (JP)

(72) Inventor: Toru Nagashima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 713 days.

(21) Appl. No.: 17/021,410

(22) Filed: Sep. 15, 2020

(65) Prior Publication Data

US 2020/0410262 A1    Dec. 31, 2020

Related U.S. Application Data

(63) Continuation of application No. PCT/JP2019/009781, filed on Mar. 11, 2019.

(30) Foreign Application Priority Data

Mar. 15, 2018   (JP) .................................. 2018-047840

(51) Int. Cl.
G01S 17/89       (2020.01)
G01S 17/931      (2020.01)
(Continued)

(52) U.S. Cl.
CPC ............ G01S 17/89 (2013.01); G01S 17/894 (2020.01); G01S 17/931 (2020.01);
(Continued)

(58) Field of Classification Search
CPC ...... G01S 17/89; G01S 17/894; G01S 17/931; G01S 7/4802; G01S 17/42; G01S 13/931;
(Continued)

(56) References Cited

U.S. PATENT DOCUMENTS

2004/0036261 A1    2/2004  Breed
2015/0198735 A1*   7/2015  Muensterer ........... G01S 7/4802
                                                      702/5
(Continued)

FOREIGN PATENT DOCUMENTS

JP    08-029135 A     2/1996
JP    2009-098023 A   5/2009
(Continued)

OTHER PUBLICATIONS

International Preliminary Report on Patentability (Form PCT/IB/373) and the Written Opinion of the International Searching Authority (Form PCT/ISA/237) dated Sep. 15, 2020, in corresponding International Application No. PCT/JP2019/009781. (13 pages).
(Continued)

*Primary Examiner* — Nimesh Patel
(74) *Attorney, Agent, or Firm* — BUCHANAN INGERSOLL & ROONEY PC

(57) ABSTRACT

A three-dimensional sensor generates multiple items of line data with respect to multiple horizontal lines arranged at different heights. Multiple first neural networks each generate first intermediate data relating to a corresponding item from among the multiple items of line data. Each first intermediate data indicates the probability of matching between the corresponding line data and each of multiple portions of multiple kinds. A combining processing unit receives the multiple items of first intermediate data, and combines the first intermediate data thus received so as to generate at least one item of second intermediate data. A second neural network receives the at least one item of second intermediate data, and generates final data that indicates the probability of matching between the object and each of the multiple kinds.

11 Claims, 20 Drawing Sheets

(51) Int. Cl.
　　　*G01S 17/894*　　　(2020.01)
　　　*G06V 20/58*　　　(2022.01)
　　　*G06V 20/64*　　　(2022.01)
　　　*G06F 18/21*　　　(2023.01)

(52) U.S. Cl.
　　　CPC .......... *G06F 18/2193* (2023.01); *G06V 20/58* (2022.01); *G06V 20/64* (2022.01)

(58) Field of Classification Search
CPC ......... G01S 15/8904; G01S 2013/9325; G01S 11/12; G01S 15/931; G01S 7/403; G01S 7/4972; G01S 13/426; G01S 13/726; G01S 13/89; G01S 13/935; G01S 15/06; G01S 15/89; G01S 15/8906; G01S 2013/9319; G01S 2013/93185; G01S 2013/932; G01S 7/04; G01S 7/497; G01S 17/86; G01S 13/867; G01S 13/86; G01S 7/417; G01S 13/87; G01S 7/4808; G01S 13/865; G01S 15/86; G01S 17/08; G01S 5/0036; G01S 5/015; G01S 5/018; G01S 17/06; G01S 13/06; G01S 19/42; G01S 2013/93273; G06F 18/2193; G06V 20/58; G06V 20/64; G06V 20/56; G06V 40/103; G06V 10/443; G06V 20/10; G06V 20/182; G06V 20/40; G06V 20/588; G06V 10/10; G06V 10/245; G06V 10/507; G06V 2201/12; G06V 40/171; G06V 40/19; G06V 40/20; G08G 1/165; G08G 1/166; G08G 1/09626; G08G 1/096716; G08G 1/0969; G08G 1/096775; G05D 1/0231; G05D 1/024; G05D 1/0242; G05D 1/0251; G05D 1/0255; G05D 1/0272; G05D 1/0274; G05D 2201/0206; G05D 2201/0211; G05D 2201/0209; G05D 2201/0216; G05D 1/021; G01C 22/00; G01C 23/00; G01C 21/005; G01C 21/3647; G01C 11/06; G01C 11/02; G01C 21/14; G01C 21/30; G01C 21/3697; B62D 15/0255; B62D 15/021; B62D 15/0265; G06N 3/045; G06N 3/08; G06N 20/00; G06N 3/04; G06N 3/02; G06N 3/088; G06N 3/047; G06N 7/01; G06T 2207/20084; G06T 2207/30252; G06T 2207/20081; G06T 2207/10028; G06T 7/593; G06T 7/70; G06T 7/55; G06T 2207/30256; G06T 2207/30261; G06T 2207/10012; G06T 2207/10021; G06T 7/50; G06T 7/11; G06T 17/00; G06T 2207/30248; G06T 7/75; G06T 7/20; G06T 2207/30236; G06T 19/003; G06T 2200/04

See application file for complete search history.

(56)　　　References Cited

U.S. PATENT DOCUMENTS

| | | | |
|---|---|---|---|
| 2016/0325753 A1* | 11/2016 | Stein | .................. B60G 17/0182 |
| 2017/0075356 A1 | 3/2017 | Delp | |
| 2018/0059679 A1* | 3/2018 | Taimouri | ................. G06N 3/08 |
| 2020/0183007 A1* | 6/2020 | Nagashima | ............. G01S 17/48 |

FOREIGN PATENT DOCUMENTS

| | | |
|---|---|---|
| JP | 2011-186584 A | 9/2011 |
| JP | 2015-114261 A | 6/2015 |
| JP | 2017-056935 A | 3/2017 |
| WO | 2019/035363 A1 | 2/2019 |

OTHER PUBLICATIONS

International Search Report (Form PCT/ISA/210) dated Apr. 23, 2019, in corresponding International Application No. PCT/JP2019/009781. (3 pages).

Extended European Search Report dated Nov. 4, 2021, issued in corresponding European Application No. 19767179.5. (7 pages).

Nagashima et al., "Object Classification Integrating Estimation of Each Scan Line With Lidar", 2017 IEEE 6th Global Conference on Consumer Electronics (GCCE), IEEE, Oct. 24, 2017, pp. 1-4, XP033286998.

* cited by examiner

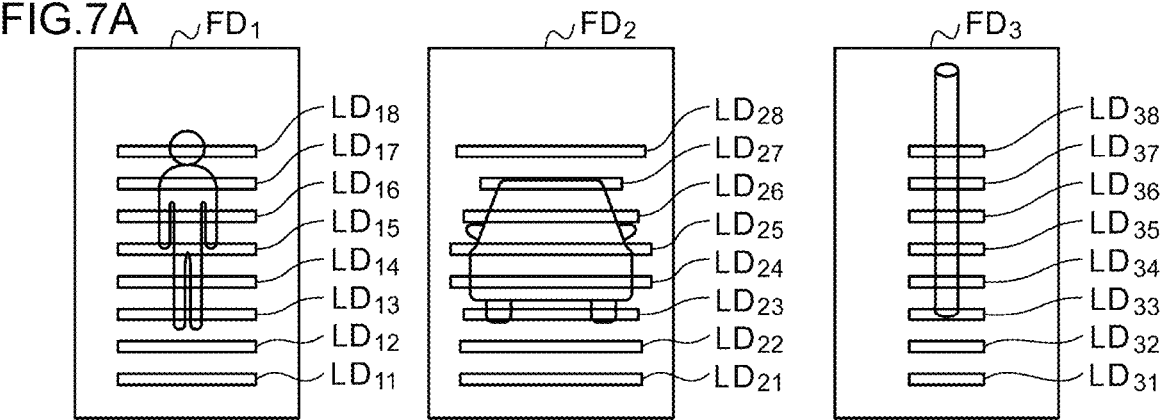
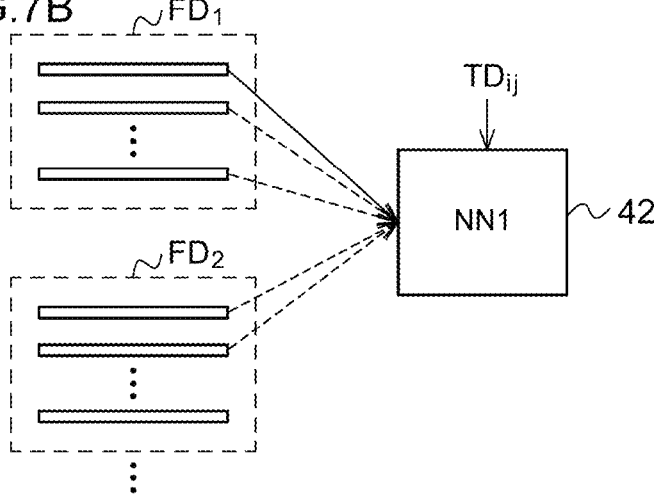
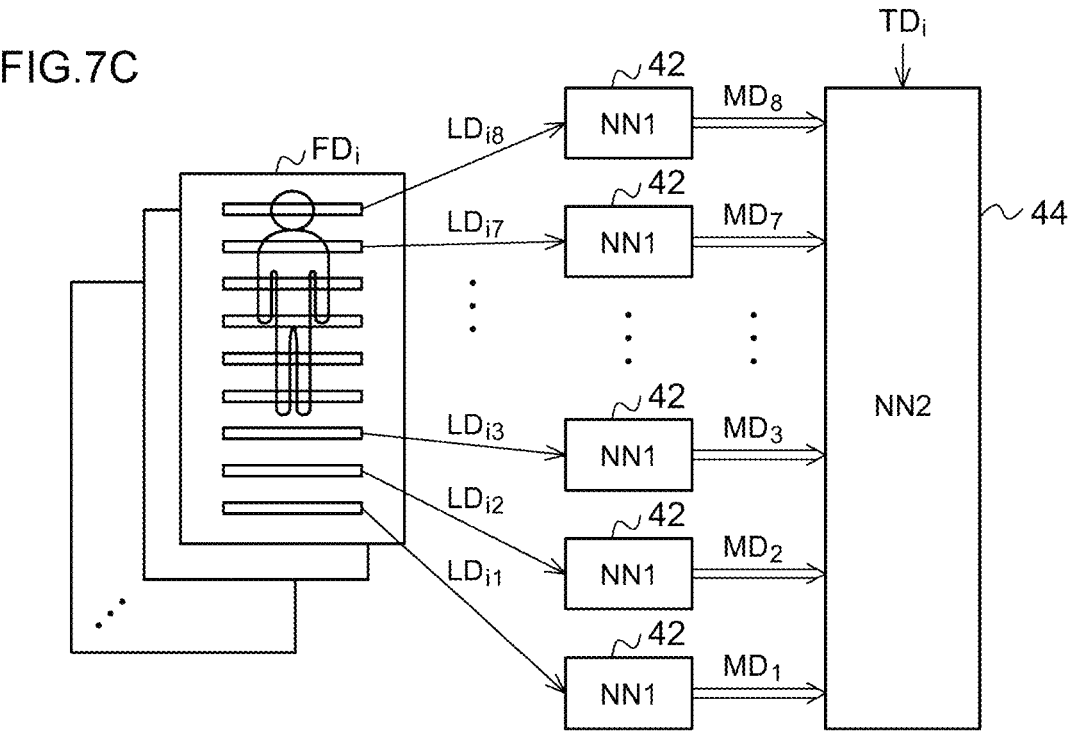

FIG.9

| Category | Accuracy rate |
|---|---|
| Total | 0.684 |
| Human - 0th | 0.675 |
| Human - 1st | 0.650 |
| Human - 2nd | 0.631 |
| Human - 3rd | 0.308 |
| Human - 4th | 0.708 |
| Human - 5th | 0.644 |
| Human - 6th | 0.506 |
| Human - 7th | 0.314 |
| Car - 0th | 0.483 |
| Car - 1st | 0.790 |
| Car - 2nd | 0.523 |
| Car - 3rd | 0.657 |
| Car - 4th | 0.813 |
| Car - 5th | 0.060 |
| Car - 6th | 0.277 |
| Car - 7th | 1.000 |
| Bicycle - 0th | 0.844 |
| Bicycle - 1st | 0.547 |
| Bicycle - 2nd | 0.633 |
| Bicycle - 3rd | 0.661 |
| Bicycle - 4th | 0.458 |
| Bicycle - 5th | 0.917 |
| Bicycle - 6th | 0.606 |
| Bicycle - 7th | 0.550 |
| Pole - all | 0.999 |

FIG.10

| Category | Accuracy rate |
|---|---|
| Total | 0.994 |
| Human | 1.000 |
| Car | 1.000 |
| Bicycle | 0.978 |
| Pole | 1.000 |

FIG.18

$$
\begin{array}{ll}
MD_{1-1} & [\ a_{11}\ \ a_{21}\ \cdots\ a_{K1}\ ] \\
MD_{1-2} & [\ a_{12}\ \ a_{22}\ \cdots\ a_{K2}\ ] \\
\quad\vdots & \\
MD_{1-N} & [\ a_{1N}\ \ a_{2N}\ \cdots\ a_{KN}\ ]
\end{array}
$$

⇩ Average $$MD_2 \quad [\ b_1\ \ b_2\ \cdots\ b_K\ ]$$

OBJECT IDENTIFICATION SYSTEM

BACKGROUND

1. Technical Field

The present disclosure relates to an object identification system.

2. Description of the Related Art

Candidates of vehicle sensors include Light Detection and Ranging, Laser Imaging Detection and Ranging (LiDAR), cameras, millimeter-wave radars, ultrasonic sonars, and so forth. In particular, LiDAR has advantages as compared with other sensors. Examples of such advantages include: (i) an advantage of being capable of identifying an object based on point group data; (ii) an advantage in employing active sensing of providing high-precision detection even in bad weather conditions; (iii) an advantage of providing wide-range measurement; etc. Accordingly, LiDAR is anticipated to become mainstream in vehicle sensing systems.

The precision of object identification based on the point group data generated by the LiDAR increases according to an increase in the resolution of the point group data. However, this involves a drastic increase in calculation costs. In consideration of a case in which the LiDAR is mounted on a vehicle, in some cases, it may be necessary to mount a low-cost, low-end processing device. In this case, such an arrangement naturally requires the number of scan lines to be reduced.

SUMMARY

The present disclosure has been made in view of such a situation.

An embodiment of the present disclosure relates to an object identification system. The object identification system includes: a three-dimensional sensor structured to generate multiple items of line data for multiple horizontal lines defined with different heights; and a processing device structured to identify the kind (category or class) of an object based on the multiple items of line data. The processing device includes: multiple first neural networks each of which is structured to generate first intermediate data relating to a corresponding one from among the multiple items of line data such that the first intermediate data indicates a probability of matching (attribution probability) between the corresponding line data and each of multiple portions of multiple kinds; a combining processing unit structured to receive the multiple items of first intermediate data that corresponds to the multiple items of line data, and to combine the multiple items of first intermediate data so as to generate at least one item of second intermediate data; and a second neural network structured to receive the at least one item of second intermediate data, and generate final data that indicates a probability of matching between the object and each of the multiple kinds.

Another embodiment of the present disclosure relates to a motor vehicle. The motor vehicle may include the object identification system described above.

Also, the three-dimensional sensor may be built into a headlamp.

Yet another embodiment of the present disclosure relates to an automotive lamp. The automotive lamp may include the object identification system described above.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7A through 7C are diagrams for explaining a first learning method;

FIG. 9 is a diagram showing the classification accuracy rates for 25 categories provided by the first neural networks;

FIG. 10 is a diagram showing the classification accuracy rates for four categories provided by the second neural network;

FIG. 18 is a diagram showing an example of processing supported by a combining processing unit;

DETAILED DESCRIPTION

Overview of the Embodiments

Figure 1:
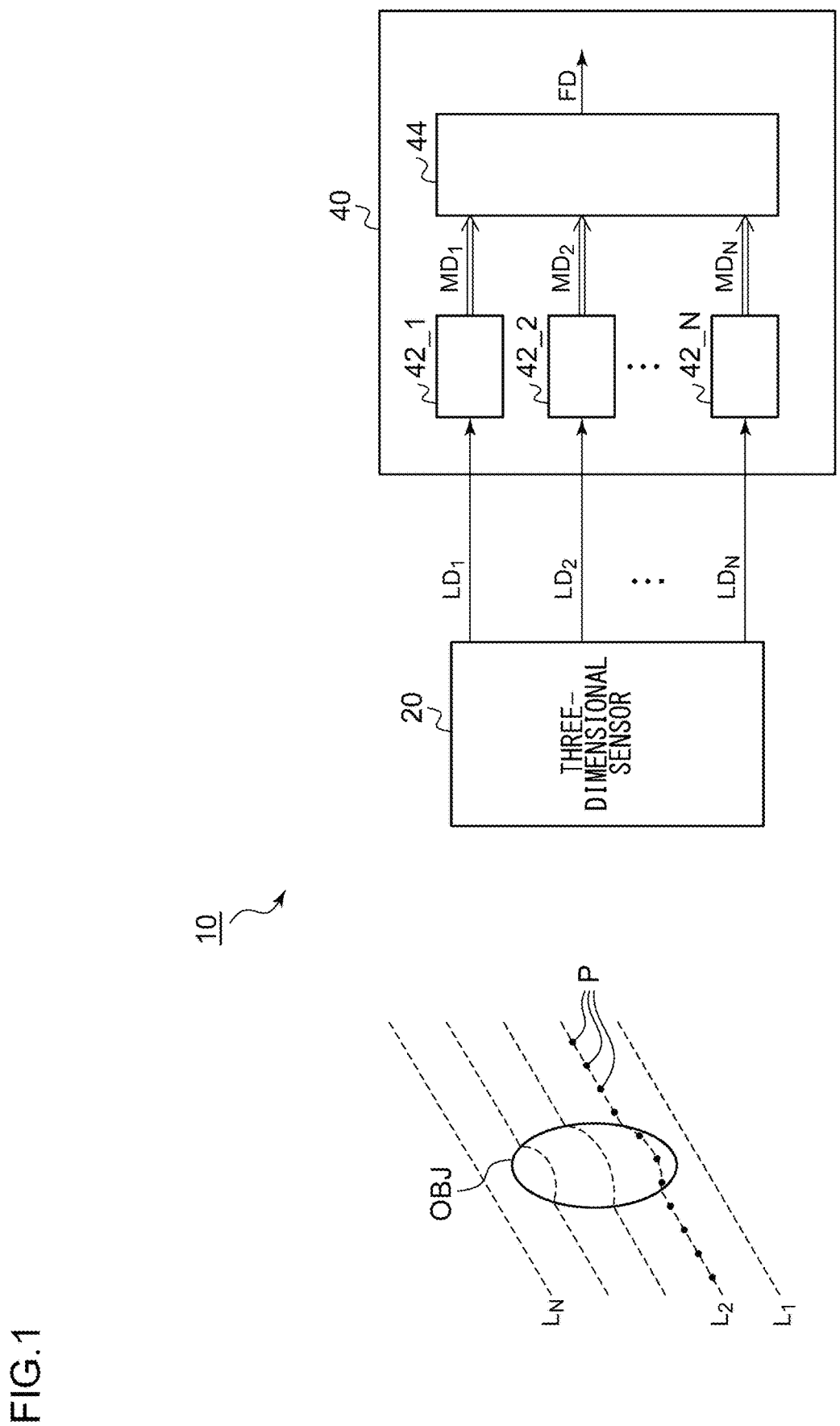
FIG. 1 is a block diagram showing an object identification system according to a first embodiment.

An embodiment disclosed in the present specification relates to an object identification system. The object identification system includes: a three-dimensional sensor structured to generate multiple items of line data for multiple horizontal lines defined with different heights; and a processing device structured to identify the kind (category or class) of an object based on the multiple items of line data. The processing device includes: multiple first neural networks each of which is structured to generate first intermediate data relating to a corresponding one from among the multiple items of line data such that the first intermediate data indicates a probability of matching (attribution probability) between the corresponding line data and each of multiple portions of multiple kinds; a combining processing unit structured to receive the multiple items of first intermediate data that corresponds to the multiple items of line data, and to combine the multiple items of first intermediate data so as to generate at least one item of second intermediate data; and a second neural network structured to receive the at least one item of second intermediate data, and generate final data that indicates a probability of matching between the object and each of the multiple kinds.

This arrangement allows the kind of an object to be judged using a small number of horizontal lines. Furthermore, by combining the multiple items of first intermediate data, this arrangement allows the height-direction dependence to be reduced. This relaxes the restriction imposed on the installation of the three-dimensional sensor. It should be noted that the combining processing does not involve complete loss of the information with respect to the height direction. That is to say, even after the combining processing, each portion continues to have height information.

Also, the number of the at least one item of second intermediate data may be one. Also, the second intermediate data may be obtained based on all the multiple items of first intermediate data.

Also, the number of the at least one item of second intermediate data may be plural. Also, each item of the second intermediate data may be obtained based on a predetermined number of consecutive items selected from among the multiple items of first intermediate data.

Also, the at least one item of second intermediate data may be an average or a sum total of a predetermined number of corresponding items of first intermediate data. Also, the average value may be calculated as a simple average value. Also, the average value may be calculated as a weighted average value. Also, the at least one item of second intermediate data may be obtained as the maximum value of corresponding items of the first intermediate data.

Also, the processing device may execute: instructing the first neural networks to learn using multiple items of line data obtained by measuring multiple portions of multiple kinds; and instructing the second neural network to learn in a state in which outputs of the multiple first neural networks after learning are combined to the second neural network via the combining processing unit.

Also, the processing device may support normalization as preprocessing in which each value included in each line data is divided by a predetermined value.

Also, the kinds of the object may include at least a pedestrian, a person on a bicycle, and a motor vehicle.

Description will be made below regarding the present disclosure based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present disclosure. Also, it is not necessarily essential for the present disclosure that all the features or a combination thereof be provided as described in the embodiments.

First Embodiment

FIG. 1 is a block diagram showing an object identification system 10 according to a first embodiment. The object identification system 10 is configured as an in-vehicle system to be mounted on a vehicle such as an automobile, motorcycle, or the like. The object identification system 10 judges the kind (which is also referred to as a "category" or "class") of the object OBJ in the vicinity of the vehicle.

The object identification system 10 mainly includes a three-dimensional sensor 20 and a processing device 40. The three-dimensional sensor 20 generates multiple items of line data $LD_1$ through $LD_N$ with respect to multiple horizontal lines $L_1$ through $L_N$ defined with different heights. The number N of the horizontal lines is not restricted in particular. Specifically, the number N of the horizontal lines is set to 20 or less, and is preferably set on the order of 4 to 12. Each item of line data LD includes distance information with respect to the distance up to each of multiple sampling points P defined along the corresponding horizontal line L. The data set of the multiple items of line data $LD_1$ through $LD_N$ will be referred to as "distance measurement data". The three-dimensional sensor 20 is not restricted in particular. However, in a case in which there is a need to identify an object with small irregularities, such as a pedestrian, with high precision, a LiDAR is preferably employed. The number N of the horizontal lines represents a so-called resolution in the vertical direction. The configuration of the LiDAR is not restricted in particular. That is to say, the LiDAR may be configured as a scanning LiDAR or a non-scanning LiDAR.

The processing device 40 identifies the kind (category) of the object based on the measurement data including the multiple items of line data $LD_1$ through $LD_N$. The processing device 40 is configured to handle data including a single object as a processing target. In a case in which an item of distance measurement data includes multiple objects, the distance measurement data is divided by pre-processing into multiple sub-frames each including a single object. The processing device 40 handles each sub-frame as a processing unit.

The processing device 40 may be provided as a combination of a processor (hardware component) such as a Central Processing Unit (CPU), Graphics Processing Unit (GPU), microcontroller, or the like, and a software program to be executed by the processor (hardware component). The processing device 40 may be configured as a combination of multiple processors.

For example, examples of the kind of the object include a pedestrian, bicycle, automobile, pole, and the like. Regarding a pedestrian, a pedestrian as viewed from the front, a pedestrian as viewed from the rear, and a pedestrian as viewed from the side may be classified and defined as the same kind of object. The same can be said of an automobile and bicycle. In the present embodiment, this definition is employed.

Figure 2:
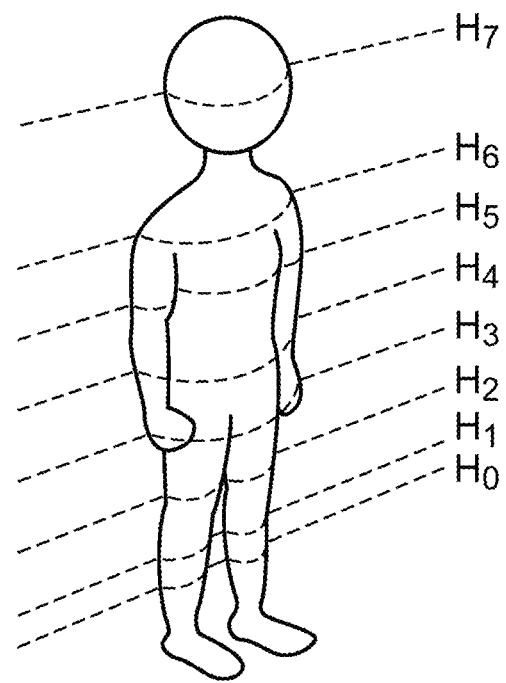
FIG. 2 is a diagram showing an example of multiple portions defined for a pedestrian.

With the present embodiment, the object OBJ is defined such that it has multiple portions (which will be referred to as "categories or sub-categories") positioned at different heights. FIG. 2 is a diagram showing an example of the multiple portions defined with respect to a pedestrian. Regarding the pedestrian, M portions H0 through HM-1 are defined. Description will be made in the present embodiment regarding an arrangement in which M=N=8. Here, $H_0$ indicates the knees, $H_1$ indicates the upper above-the-knee portions, $H_2$ indicates the upper legs, $H_3$ indicates the waist, $H_4$ indicates the abdomen, $H_5$ indicates the chest, $H_6$ indicates the shoulders, and $H_7$ indicates the face.

In the same manner, regarding a bicycle, multiple portions $B_0$ through $B_7$ are defined at different heights. Also, regarding an automobile, multiple portions $C_0$ through $C_7$ are defined at different heights. Regarding a pole, multiple portions $P_0$ through $P_7$ can be defined at different heights.

However, there is substantially no difference in the profile between portions regardless of height. Accordingly, there is no need to distinguish the multiple portions $P_0$ through $P_7$. That is to say, the data of a pole is handled as a single output $P_0$.

FIGS. 3A through 3D are diagrams showing multiple items of line data of a pedestrian, bicycle, automobile, and pole acquired by the three-dimensional sensor 20. In FIG. 3, the multiple items of line data represent the shapes of multiple portions defined beforehand.

Returning to FIG. 1, the processing device 40 generates intermediate data MD with respect to the kind of the object OBJ and the portion thereof for each item of line data LD. The intermediate data $MD_i$ may indicate the kind of the object OBJ and the portion thereof that corresponds to the line data $LD_i$ (horizontal line Li) in a statistical manner.

Subsequently, the processing device 40 integrates the multiple items of intermediate data $MD_1$ through $MD_N$ that correspond to the multiple items of line data $LD_1$ through $LD_N$ so as to generate final data FD that indicates the kind of the object OBJ. The final data FD may indicate the kind of the object OBJ in a statistical manner.

As functional components, the processing device 40 includes multiple first calculation units 42_1 through 42_N and a second calculation unit 44. The blocks indicated by the calculation units 42 and 44 do not necessarily mean that such blocks are configured as independent hardware blocks. For example, in a case in which the processing device 40 is configured as a single core, the multiple calculation units 42 and 44 may correspond to the single core. In a case in which the processing device 40 includes multiple cores, each core may function as a corresponding one of the multiple calculation units 42 and 44.

The i-th ($1 \leq i \leq N$) calculation unit 42_i processes the corresponding line data $LD_i$ so as to generate the intermediate data $MD_i$. The second calculation unit 44 integrates the intermediate data $MD_1$ through $MD_N$ generated by the multiple first calculation units 42_1 through 42_N so as to generate the final data FD.

The above is the basic configuration of the object identification system 10. The configuration of the processing device 40 is not restricted in particular. For example, the processing device 40 may be configured using a neural network. Description will be made below regarding a configuration evaluated by the present inventor. Description will be made with a neural network that corresponds to the first calculation unit 42 as a first neural network $NN_1$, and with a neural network that corresponds to the second calculation unit 44 as a second neural network $NN_2$.

Figure 4:
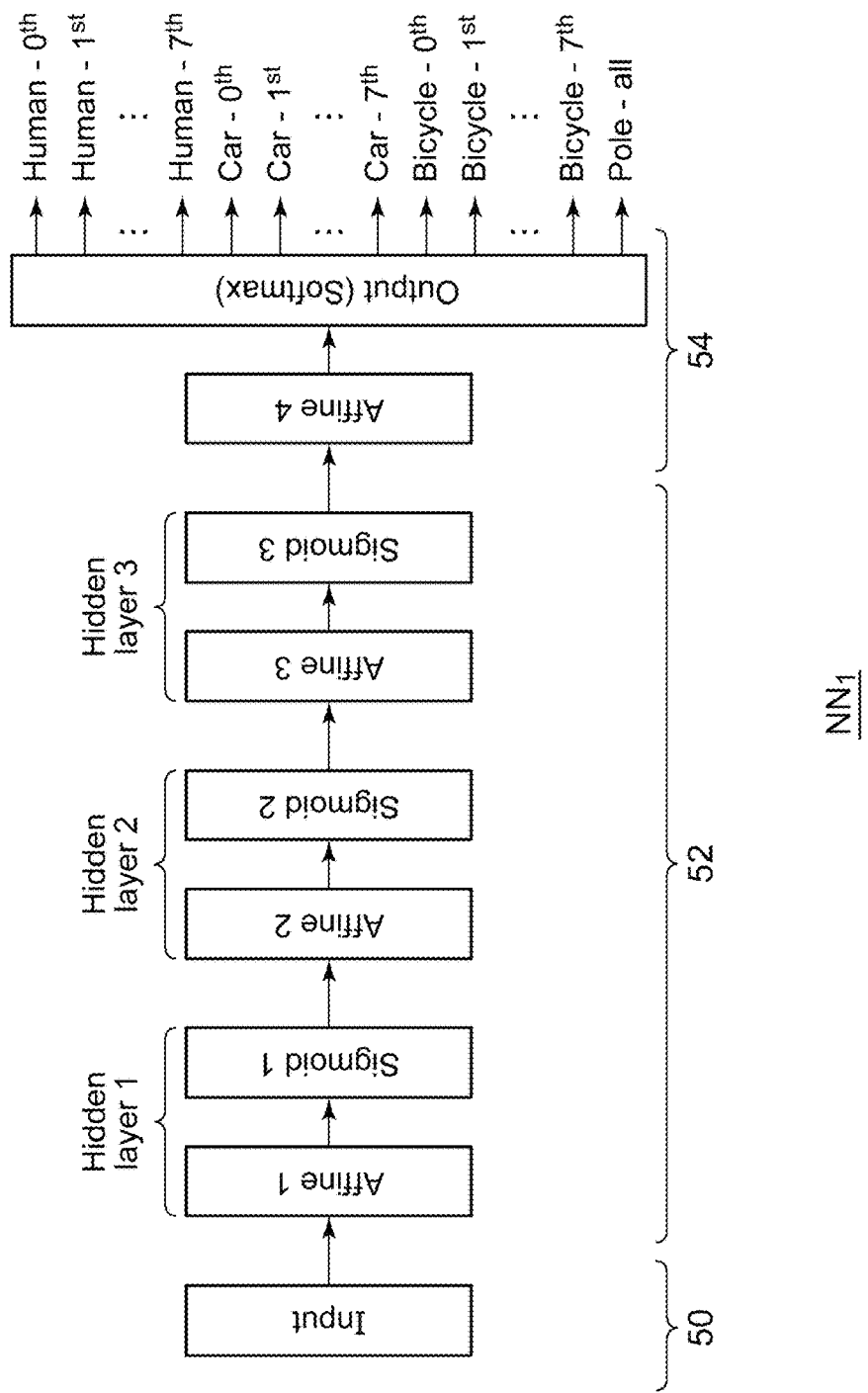
FIG. 4 is a block diagram showing an example configuration of a first neural network.

FIG. 4 is a block diagram showing an example configuration of the first neural network $NN_1$. The first neural network $NN_1$ is configured including an input layer 50, three intermediate layers (hidden layers) 52, and an output layer 54. The number of units of the input layer 50 is determined according to the number of sample points for each line, and specifically, is designed to be 5,200. The three intermediate layers are designed with the number of units of 200, 100, and 50, respectively. The intermediate layers 52 support transformation using affine transformation and a sigmoid function. The output layer 54 supports attribution probability calculation using affine transformation and a softmax function.

In the output layer 54, a total of 25 categories, i.e., the categories of the portions $H_0$ through $H_7$ of a pedestrian, the categories of the portions $C_0$ through $C_7$ of an automobile, the categories of the portions $B_0$ through $B_7$ of a bicycle, and the category of the portion $P_0$ of a pole. The intermediate data $MD_i$ includes multiple items of data Human-0th through Human-7th, Car-0th through Car-7th, Bicycle-0th through Bicycle-7th, and Pole-all, which indicate the probabilities of a given portion to be identified matching the portions $H_0$ through $H_7$ of a pedestrian, the portions $C_0$ through $C_7$ of an automobile, the portions $B_0$ through $B_7$ of a bicycle, and the portion $P_0$ of a pole, respectively.

Figure 5:
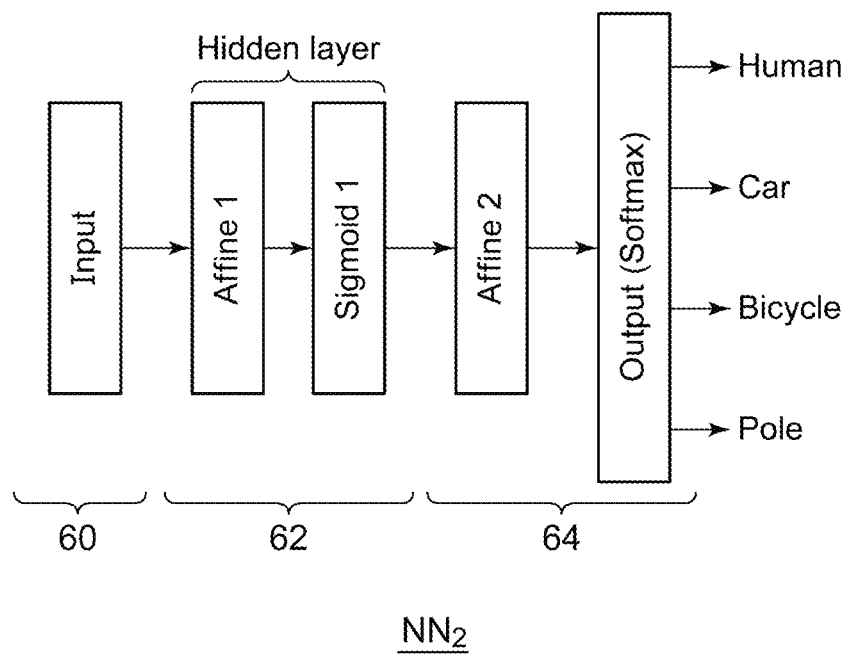
FIG. 5 is a block diagram showing an example configuration of a second neural network.

FIG. 5 is a block diagram showing an example configuration of the second neural network $NN_2$. The second neural network $NN_2$ is configured including an input layer 60, a single intermediate layer 62, and an output layer 64. The input layer 60 is designed such that the number of units thereof is a product of the number of the previous first neural networks $NN_1$ (N=8) and the number of categories (25), i.e., 200. The intermediate layer 62 is configured as a single layer designed such that the number of units is 50. The output layer 64 is designed so as to define four categories, i.e., the pedestrian category (Human), the automobile category (Car), the bicycle category (Bicycle), and the pole category (Pole). That is to say, the final data FD includes four items of data Human, Car, Bicycle, and Pole that correspond to the probabilities of a given object OBJ matching a pedestrian, automobile, bicycle, and pole, respectively.

As common settings, the first neural network $NN_1$ and the second neural network $NN_2$ are designed with the Adam method as the parameter update method, with a learning rate of 0.01, and with the number of iterations as 20,000.

As the preprocessing for the first neural network $NN_1$, extraction, shifting, and normalization are preferably performed.

Figure 6A:
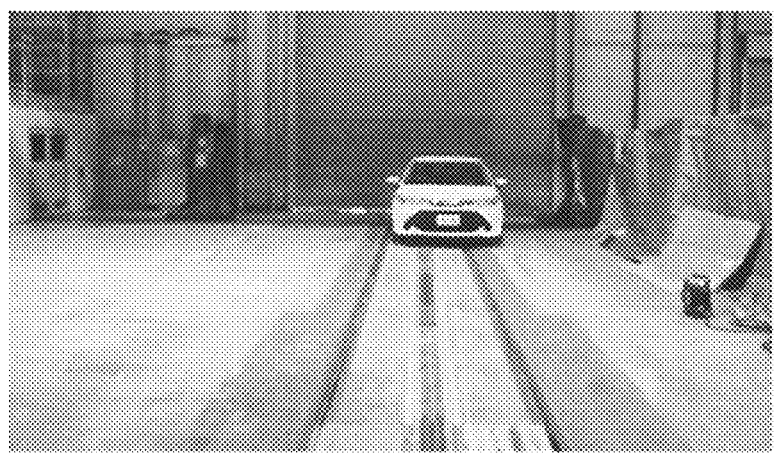
FIGS. 6A through 6C are diagrams for explaining extraction of the object.
Figure 6B:
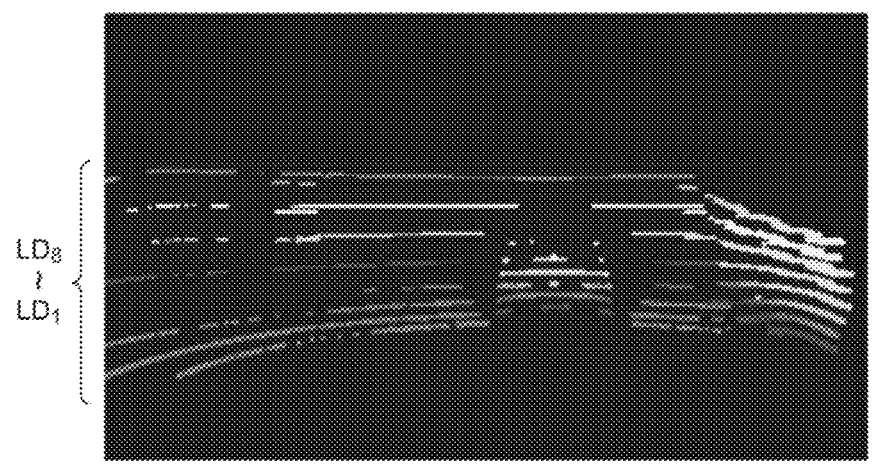
Figure 6C:
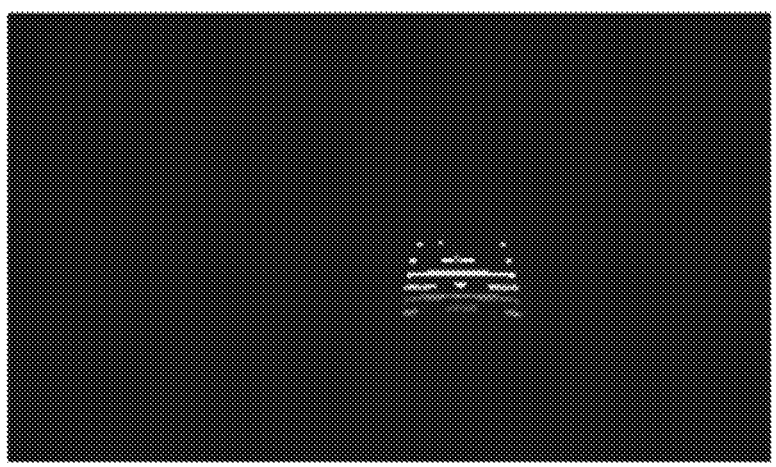

Extraction is processing for removing the background so as to extract the object OBJ. FIGS. 6A through 6C are diagrams for explaining the extraction of the object. FIG. 6A is a diagram showing an automobile employed as the object. FIG. 6B shows multiple items of line data $LD_1$ through $LD_8$ obtained when an image of the object shown in FIG. 6A is captured by means of the LiDAR. FIG. 6C shows the line data $LD_1$ through $LD_8$ extracted such that they include the object data.

Shifting is data shifting processing for shifting the object such that it is positioned at the center. Normalization is processing for dividing the distance data by a predetermined value. For example, as the predetermined value, the distance (reference distance) between the three-dimensional sensor 20 and a predetermined portion of the object OBJ set in the learning may be employed. This processing normalizes the line data such that it becomes a value in the vicinity of 1.

Next, description will be made regarding the machine learning. FIGS. 7A through 7C are diagrams for explaining a first learning method. As shown in FIG. 7A, first, the data (learning data or teaching data) to be used for learning is measured. The learning data is acquired by measuring multiple objects by means of LiDAR. Specifically, the object candidates (pedestrian, automobile, pole, person riding a bicycle, etc.) to be identified are measured under different conditions (e.g., at various distances and in various directions), so as to prepare frame data $FD_1$, $FD_2$, . . . , for learning. Each frame data $FD_i$ (i=1, 2, includes N (eight, in this example) items of line data. However, in the learning, only the effective line data in which the line crosses the object may be used. For example, in a case in which the frame data $FD_1$ is acquired for a pedestrian, the lowermost two items of line data $LD_{11}$ and $LD_{12}$ cross the ground, and do not cross the pedestrian. Accordingly, judgment may be made that the line data $LD_{11}$ and $LD_{12}$ are not used in the learning.

Subsequently, learning is performed for the first calculation unit (first neural network) 42. As shown in FIG. 7B, multiple items of effective line data $LD_{ij}$ included in the multiple items of frame data are individually input to the first calculation unit 42 together with teaching data $TD_{ij}$. For example, when the line data $LD_{18}$ of the frame $FD_1$ is input, the teaching data $TD_{ij}$ that represents the kind (category)="pedestrian" and the portion (sub-category)="face of pedestrian" is input.

The learning results thus obtained with respect to such a single first calculation unit 42 are used for all the first calculation units 42. Subsequently, learning is performed for the second calculation unit 44. Specifically, as shown in FIG. 7C, the multiple first calculation units 42 are coupled to the second calculation unit (second neural network) 44. In this state, multiple items of frame data $FD_1$, $FD_2$, ..., are individually input to the processing device 40. A set of multiple items of intermediate data $MD_1$ through $MD_8$ is generated for each frame $FD_i$ by means of the multiple first calculation units 42, which is supplied to the second calculation unit 44 configured as a downstream stage. The second calculation unit 44 receives the teaching data $TD_i$ that indicates the kind of the object included in the current frame data $FD_i$ in addition to the set of the intermediate data $MD_1$ through $MD_6$. For example, in a case in which the frame data $FD_i$ acquired by image capture for a pedestrian is input to the processing device 40, the teaching data $TD_i$ that indicates the kind="pedestrian" is supplied to the second calculation unit 44. This processing is executed for the multiple items of frame data, thereby providing the learning for the second calculation unit 44.

Description will be made regarding an experiment executed in order to investigate the effects of the object identification system 10 having the above-described configuration.

The LiDAR employed in this investigation was configured to provide eight horizontal lines. The horizontal lines were designed with irradiation angles of −18.25°, −15.42°, −12.49°, −9.46°, −6.36°, −3.19°, 0°, and 3.2°, in this order from the bottom (angular resolution in the vertical direction). The angular resolution in the horizontal direction is designed to be 0.035°. The image capture range was designed to be a range of 0 to 180°. Accordingly, each item of line data includes values of 5,200 (=180/0.035) sample points.

Figure 8A:
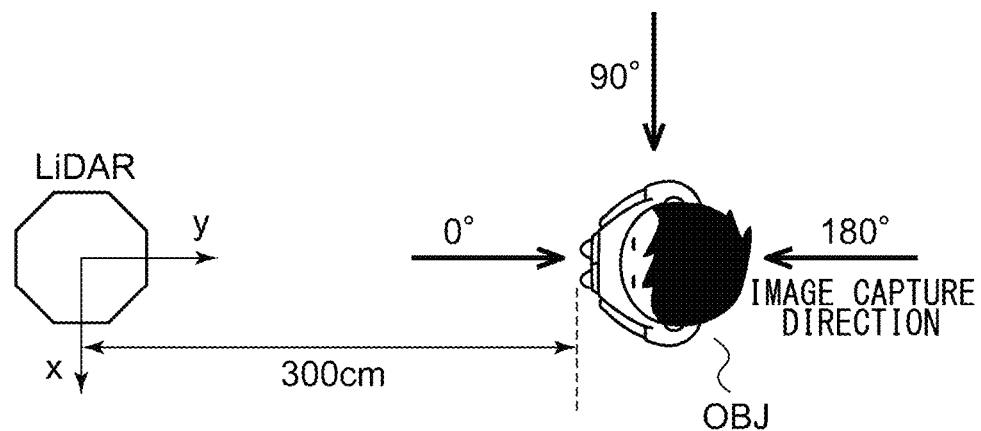
FIGS. 8A and 8B are diagrams for explaining image capture of a pedestrian.
Figure 8B:
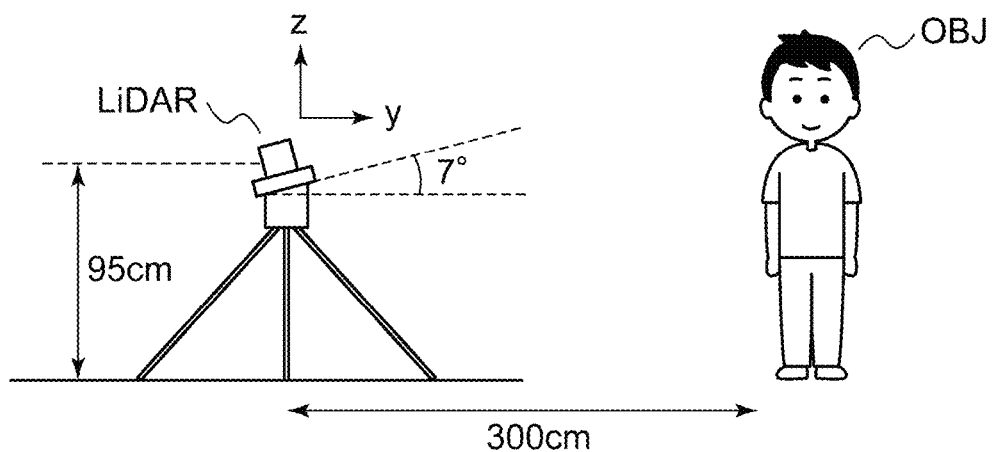

FIGS. 8A and 8B are diagrams for explaining image capture of a pedestrian. Description will be made regarding an example in which the distance (reference distance) from the center of the LiDAR up to the object OBJ is 3 m. Furthermore, description will be made assuming that the pedestrian sample is an adult male pedestrian with a height of 166 cm, and the object image is captured in nine directions (0°, 22.5°, 45°, 67.5°, 90°, 112.5°, 135°, 157.5°, and 180°). It should be noted that the direction in which the LiDAR faces the front (face, headlamp) of the object OBJ is defined to be 0°. Regarding the pedestrian, the LiDAR is set with a tilt angle (elevation angle) of 7° in the vertical direction such that the eight horizontal lines match the eight portions H0 through H7 shown in FIG. 2.

Figure 3A:
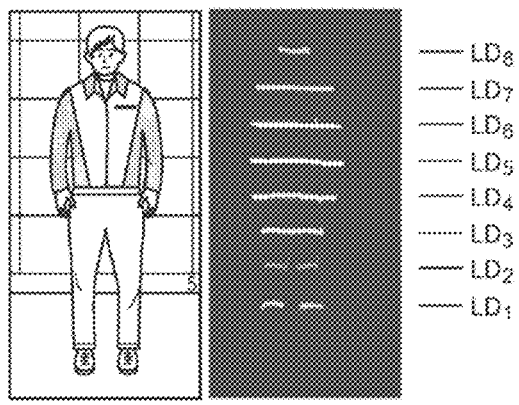
FIGS. 3A through 3D are diagrams showing multiple items of line data obtained when images of a pedestrian, bicycle, automobile, and pole are respectively captured.
Figure 3B:
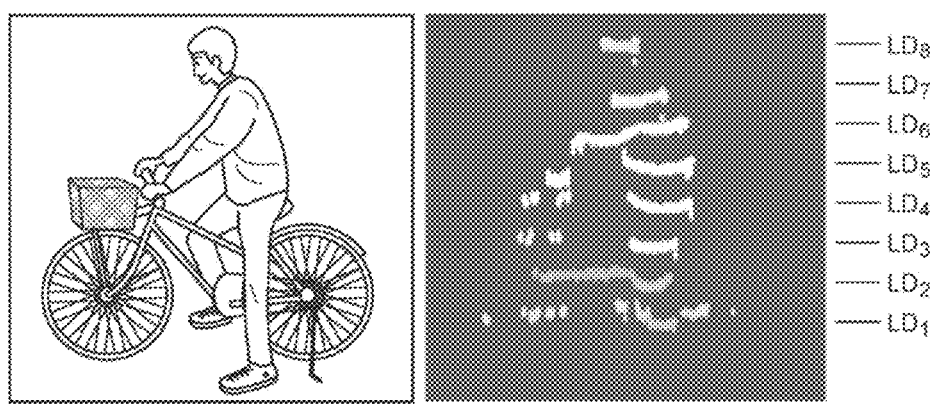
Figure 3C:
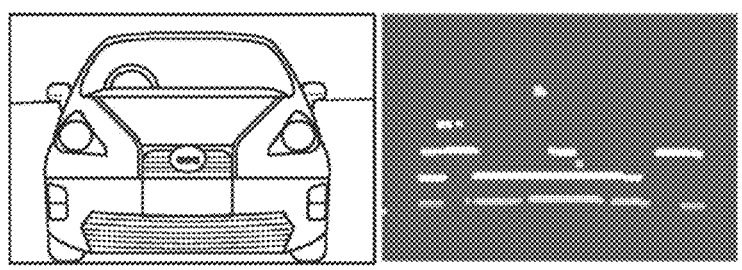
Figure 3D:
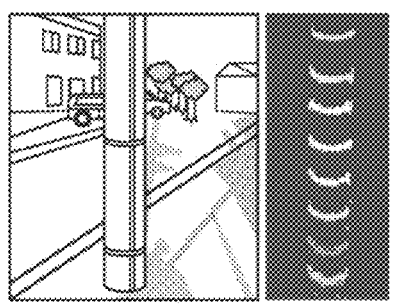

Regarding the bicycle, as shown in FIG. 3B, image data was acquired in a state in which a person was mounted on a stopped bicycle. The image data was acquired in nine directions in the same manner as in the image data acquisition for the pedestrian.

Regarding the automobile, image data was acquired for a single kind of automobile in three directions (0°, 90°, and 180°). Regarding the pole, image data was acquired for six pole samples in an arbitrary direction.

The machine learning was performed for the pedestrian and the bicycle with 3,600 frames of training data, for the automobile with 3,000 frames of training data, and for the pole with 1,700 frames of training data. The learning method described with reference to FIGS. 7A through 7C was employed.

Subsequently, the learning results were evaluated for the pedestrian and the bicycle with 360 frames of test data, and for the automobile and the pole with 300 frames of test data. FIG. 9 is a diagram showing the accuracy rate for the classification of 25 categories (sub-categories) provided by the first neural network $NN_1$. The category "Total" shown at the top indicates the total accuracy rate of the classification of the 10,560 (=(360+360+300+300) frames×8 lines) items of line data thus input as the test data. The other categories represent the accuracy rates for the classification of the respective portions of the pedestrian, automobile, bicycle, and pole.

FIG. 10 is a diagram showing the accuracy rates for the classification of the four categories provided by the second neural network $NN_2$. The category "Total" shown at the top indicates the total accuracy rate of the classification of the 1,320 (=360+360+300+300) frames thus input as the test data. The other categories represent the accuracy rates for the classification of the pedestrian (Human), automobile (Car), bicycle (Bicycle), and pole (Pole).

As can be understood from FIG. 10, this arrangement provides an accuracy rate of 100% for the pedestrian (Human), automobile (Car), and pole (Pole). However, this arrangement provides an accuracy rate of only 97.8% for only the bicycle (Bicycle). Accordingly, it can be understood that the total accuracy rate is affected by the degraded accuracy rate for the bicycle.

As described above, with the object identification system 10 according to the second embodiment, this arrangement is capable of judging the kind of the object with a dramatically high accuracy rate using only eight horizontal lines.

Furthermore, this arrangement requires only a small number of horizontal lines, i.e., only eight lines, thereby allowing the processing capacity required for the processing device 40 to be reduced.

In this example, the effects were evaluated with a fixed distance of 3 m between the object and the LiDAR. In actuality, the distance varies. Accordingly, the learning may preferably be performed for each range after various distances are classified into multiple ranges.

Figure 11:
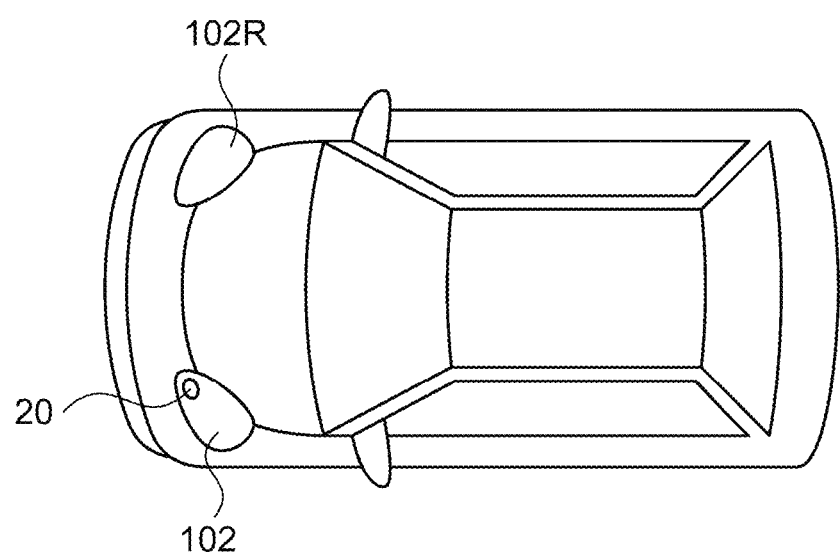
FIG. 11 is a block diagram showing an automobile including an object identification system.

FIG. 11 is a block diagram showing an automobile including the object identification system 10. The automobile 100 includes headlamps 102L and 102R. From among the components of the object identification system 10, at least the three-dimensional sensor 20 is built into at least one from among the headlamps 102L and 102R. Each headlamp 102 is positioned at a frontmost end of the vehicle body, which is most advantageous as a position where the three-dimensional sensor 20 is to be installed for detecting an object in the vicinity. The processing device 40 may be built into the headlamp 102. Also, the processing device 40 may be provided on the vehicle side. For example, from among the functions of the processing device 40, the function of generating the intermediate data may be provided by an internal component of the headlamp 102. Also, the function of generating the final data may be provided by another component on the vehicle side.

Figure 12:
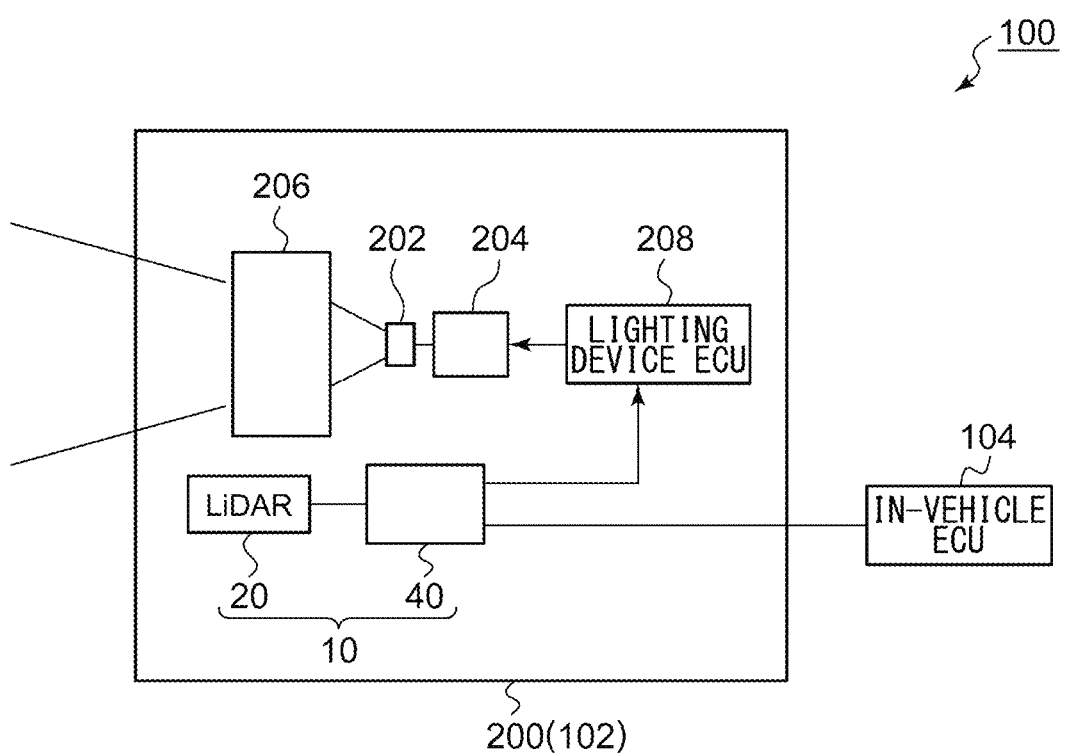
FIG. 12 is a block diagram showing an automotive lamp including an object identification system.

FIG. 12 is a block diagram showing an automotive lamp 200 including the object identification system 10. The automotive lamp 200 includes a light source 202, a lighting circuit 204, and an optical system 206. Furthermore, the automotive lamp 200 includes the three-dimensional sensor 20 and the processing device 40. The information with respect to the object OBJ detected by the processing device 40 is transmitted to the in-vehicle ECU 104. The in-vehicle ECU may support autonomous driving based on the information thus transmitted.

Also, the information with respect to the object OBJ detected by the processing device 40 may be used to support the light distribution control operation of the automotive lamp 200. Specifically, the lighting device ECU 208 generates a suitable light distribution pattern based on the information with respect to the kind of the object OBJ and the position thereof thus generated by the processing device 40. The lighting circuit 204 and the optical system 206 operate so as to provide the light distribution pattern generated by the lighting device ECU 208.

Modification with Respect to Learning Method

Figure 13A:
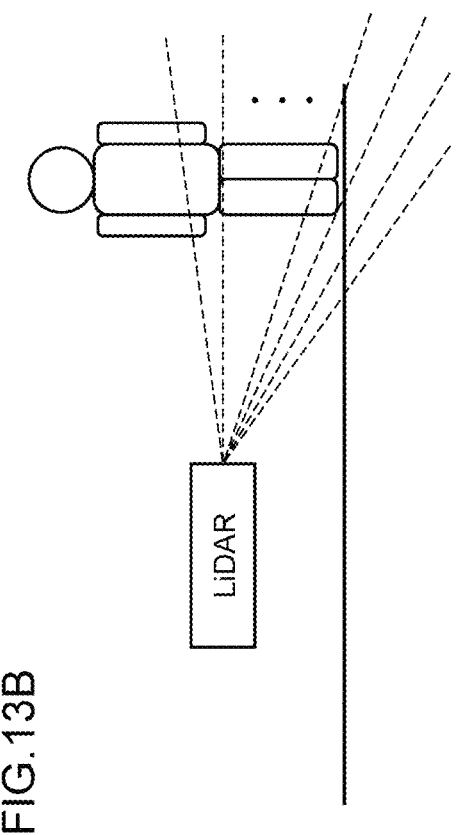
FIGS. 13A and 13B are diagrams showing the relation between the height of the LiDAR and the object.
Figure 13B:
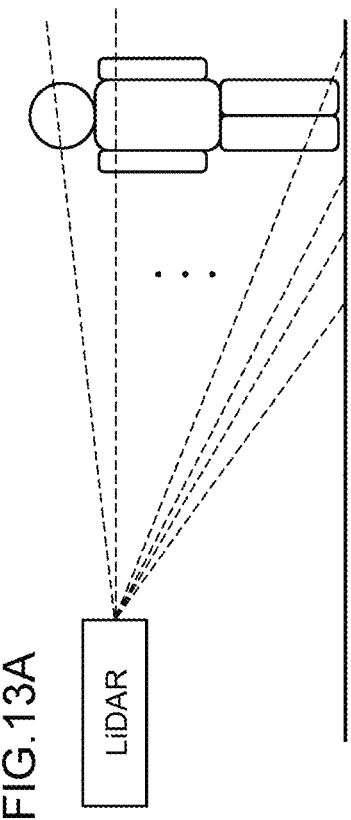

With the first learning method shown in FIGS. 7A through 7C, in some cases, this arrangement involves learning that strongly depends on the installation of the LiDAR (height, elevation angle, or the distance up to the object). FIGS. 13A and 13B are diagrams each showing the relation between the height at which the LiDAR is installed and the object. FIG. 13A shows a case in which the LiDAR is installed at a height of 145 cm in the learning. In this case, the lower three items of line data are ineffective. That is to say, the line data $LD_4$ through $LD_8$, which are the fourth line data through the eighth line data from the bottom, are used for the learning.

Description will be made assuming that, in the actual operation, as shown in FIG. 13B, the LiDAR is installed at a height of 70 cm, which is lower than that in the learning. Furthermore, description will be made assuming that the distance between the pedestrian and the LiDAR is smaller than that in the learning. In the state shown in FIG. 13B, the line data $LD_1$ through $LD_3$ match no particular portion (no particular sub-category). The line data $LD_4$ through $LD_7$ match the portion (sub-category)="legs". The line data $LD_8$ matches the portion (sub-category)="abdomen".

Figure 13C:
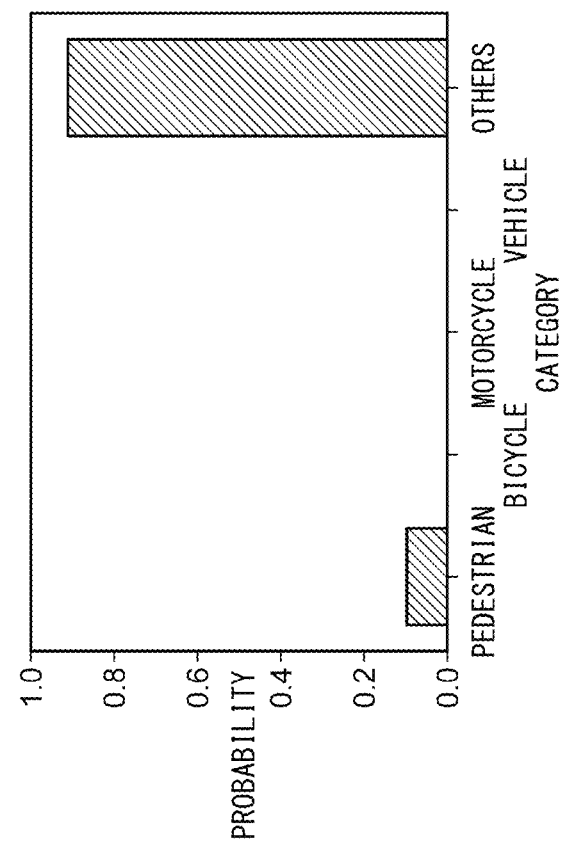
FIG. 13C is a diagram showing final data obtained in a situation shown in FIG. 13B by means of an object identification system that has learned using the first learning method.

FIG. 13C shows the final data obtained by the object identification system 10 in a situation shown in FIG. 13B in a case in which it has learned using the first learning method. In this case, the object must be identified as a pedestrian. However, false identification is obtained that there is a higher probability of other objects that differ from a pedestrian. It can be considered that this is because, with the first learning method, the classification supported by the second calculation unit 44 strongly depends on the order and combination of the sub-categories. That is to say, in a case of employing the first learning method, in some cases, such an arrangement has the potential to restrict the height at which the three-dimensional sensor is to be installed in the actual use stage due to the height that was used in the learning stage. A second learning method is designed to have a function for reducing such a restriction.

Figure 14:
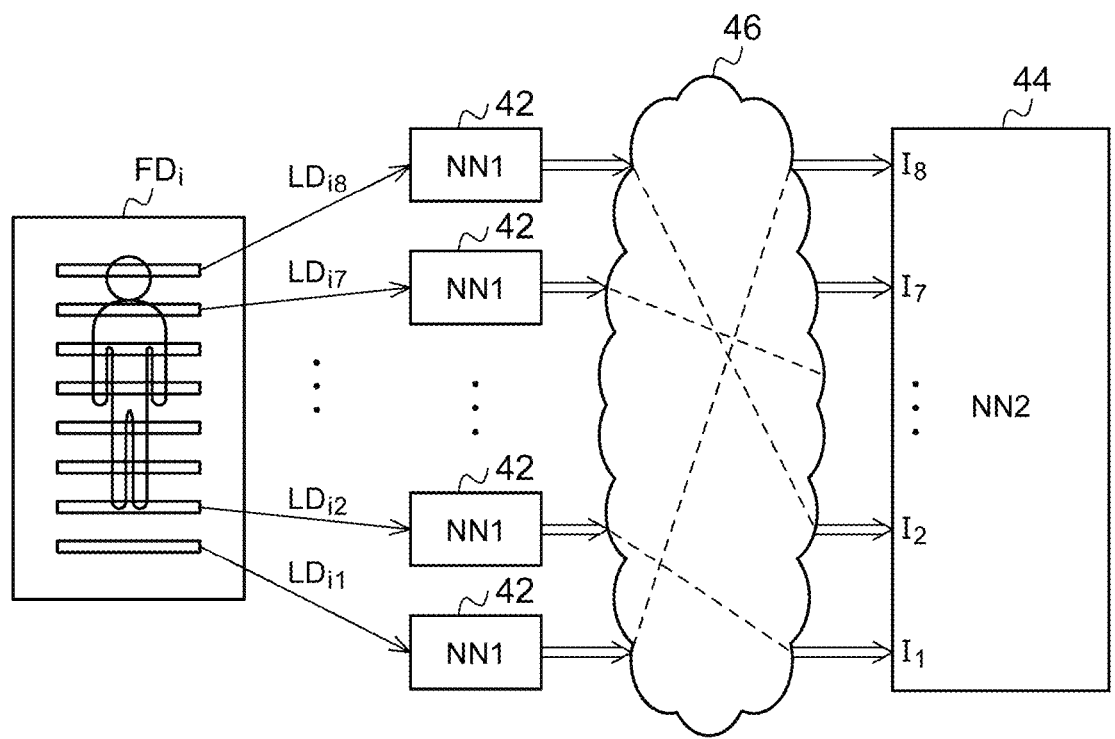
FIG. 14 is a diagram for explaining learning process for a second calculation unit using a second learning method.

With the second learning method, the first calculation units 42 each learn using the same learning method as with the first learning method. There is a difference in the learning method used for the second calculation unit 44 between the first and second learning methods. FIG. 14 is a diagram for explaining the learning process for the second calculation unit 44 using the second learning method. Specifically, in the second learning method, this arrangement instructs the second calculation unit 44 to learn while changing the correspondence relation 46 between the outputs of the multiple first calculation units 42 that have learned and multiple input nodes I1 through I8 of the second calculation unit 44. The correspondence relation 46 may be changed at random for each frame data $FD_i$.

In a case in which there is sufficient learning time, this arrangement may support the learning for each frame data $FD_i$ while switching the correspondence relation between multiple patterns. In a case in which N=8, there are 56 (=8×7) input/output combinations. Accordingly, this arrangement may support the learning for each frame data with respect to all the combinations.

Figure 15:
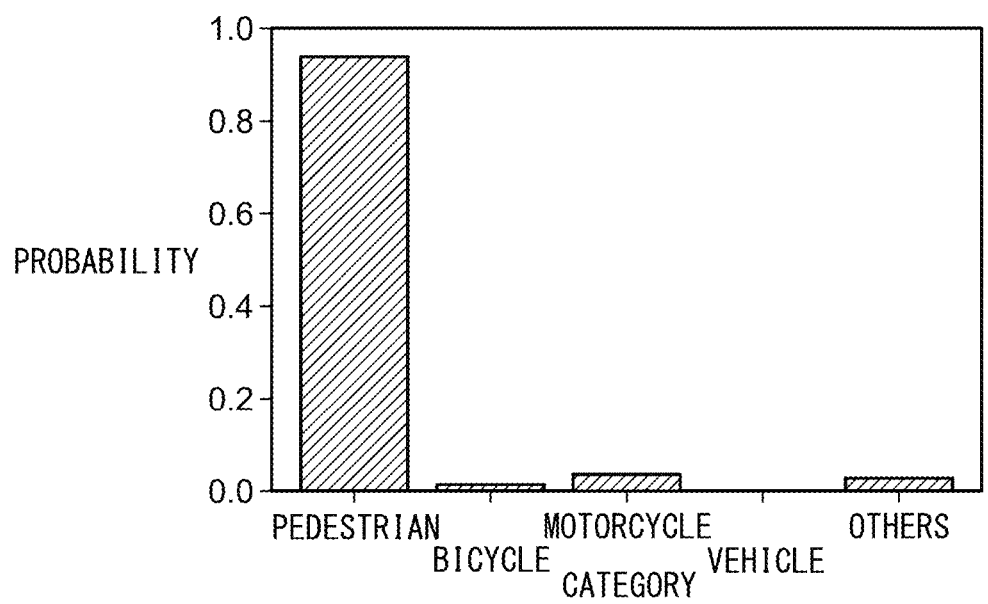
FIG. 15 is a diagram for explaining the effects of the second learning method.

FIG. 15 is a diagram for explaining the effect of the second learning method. FIG. 15 shows the final data FD obtained by the object identification system 10 that has learned using the second learning method in a case in which a pedestrian is assumed in the situation shown in FIG. 13B. This arrangement allows the accuracy rate for the identification of a pedestrian to be raised as compared with the final data shown in FIG. 13C obtained using the first learning method.

As described above, in the learning step for the second calculation unit 44, the correspondence relation between the multiple first calculation units 42 and the multiple inputs of the second calculation unit 44 is changed. This arrangement provides improved degree of freedom in installing the three-dimensional sensor such as the LiDAR or the like.

Figure 16:
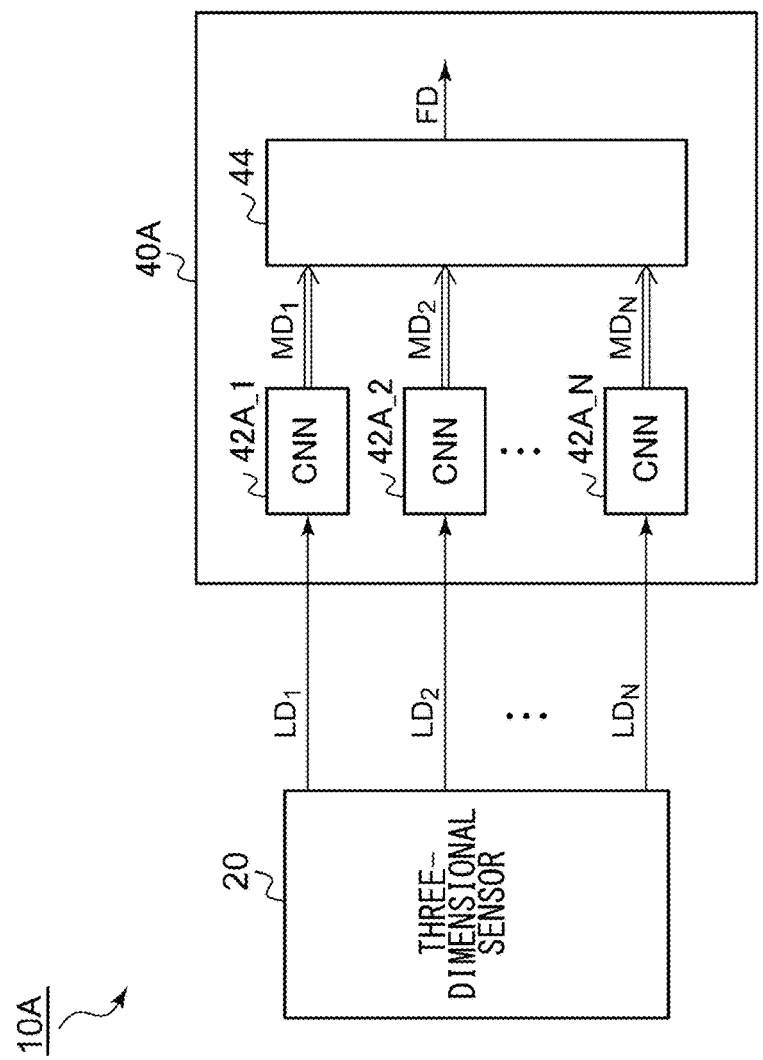
FIG. 16 is a block diagram showing an object identification system according to a modification.

FIG. 16 is a block diagram showing an object identification system 10A according to a modification. In this modification, first calculation units 42A are configured as a convolutional neural network. Typically, a convolutional neural network handles a two-dimensional image of M×N pixels. In the present embodiment, the convolutional neural network handles one-dimensional line data as a processing target, which is a new idea. The convolutional neural network is configured as a combination of a convolutional layer and a pooling layer. By employing such a convolutional neural network, such an arrangement allows the robustness to be improved for the position deviation of the object in the horizontal direction.

Second Embodiment

The above-described modification is made such that the learning method is modified so as to provide an improved identification capability. In contrast, in the second embodiment, the configuration of the processing device is modified so as to provide improved identification.

Figure 17:
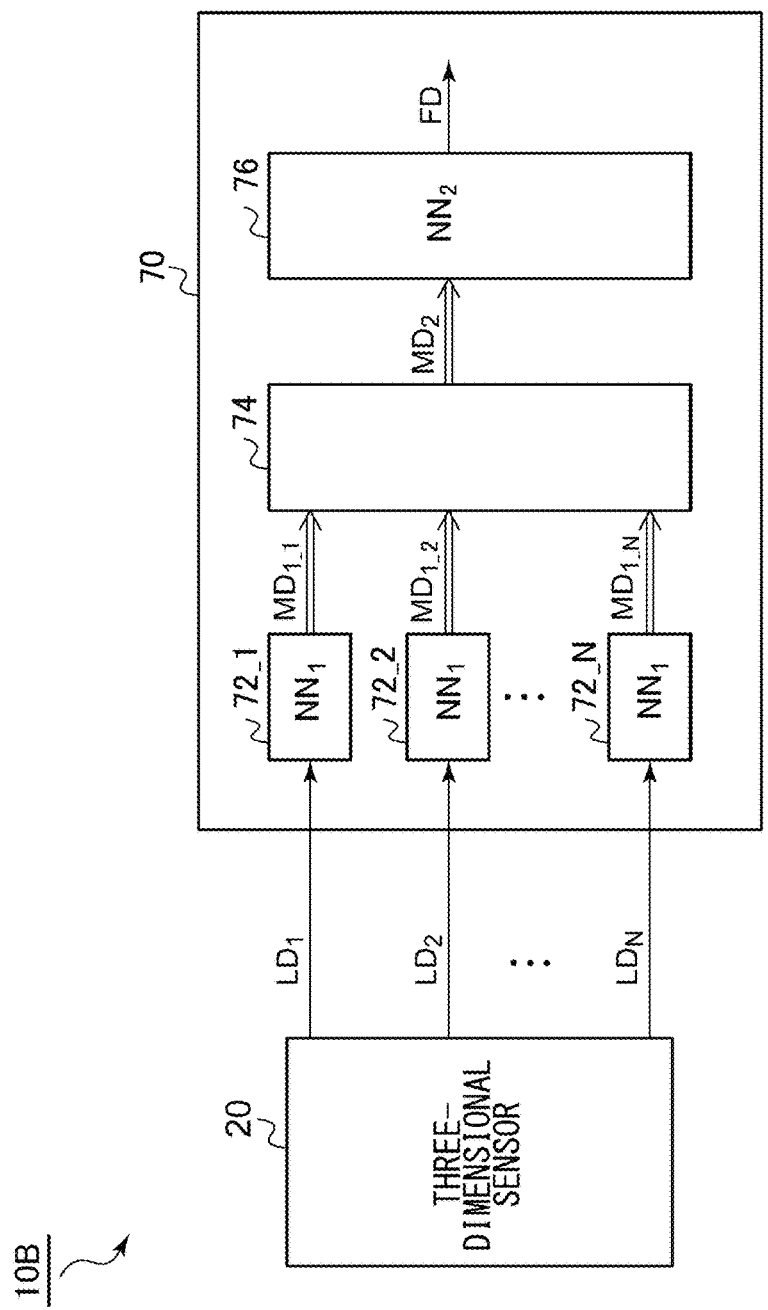
FIG. 17 is a block diagram showing an object identification system according to a second embodiment.

FIG. 17 is a block diagram showing an object identification system 10B according to a second embodiment. The object identification system 10B includes a three-dimensional sensor 20 and a processing device 70. The processing device 70 includes multiple first neural networks 72_1 through 72_N, a combining processing unit 74, and a second neural network 76.

The first neural networks 72_1 through 72_N have the same function as those provided by the first calculation units 42 (first neural network $NN_1$) described in the first embodiment. That is to say, each first neural network 72_i (i=1, 2, ..., N) generates the first intermediate data $MD_{1\_i}$ relating to the corresponding $LD_i$ from among the multiple items of line data $LD_1$ through $LD_N$. The first intermediate data $MD_{1\_i}$ indicates the probability of matching between corresponding line data $LD_1$ and each of the multiple portions (sub-categories) of the multiple kinds (categories).

The combining processing unit 74 receives the multiple items of first intermediate data $MD_{1\_1}$ through $MD_{1\_N}$ that correspond to the multiple items of line data $LD_1$ through $LD_N$, and combines the first intermediate data thus received, so as to generate at least one item of second intermediate data $MD_2$. FIG. 17 shows an example configured to support a single item of second intermediate data $MD_2$. That is to say, all the items of first intermediate data $MD_{1\_1}$ through $MD_{1\_N}$ are combined so as to generate a single item of second intermediate data $MD_2$. As with the first intermediate data $MD_1$, the second intermediate data $MD_2$ indicates the probability of matching between corresponding line data $LD_1$ and each of the multiple portions (sub-categories) of the multiple kinds (categories).

FIG. 18 is a diagram showing an example of the processing supported by the combining processing unit 74. The i-th first intermediate data $MD_{1\_i}$ includes K elements $a_{1i}$ through $a_{Ki}$. The j-th (j=1, 2, . . . , K) element $a_{ji}$ indicates the probability of matching between the i-th line data $LD_i$ and the j-th sub-category (portion). The combining processing unit 74 calculates an average of the multiple items of the first intermediate data $MD_{1\_1}$ through $MD_{1\_N}$, which is employed as the second intermediate data $MD_2$. The j-th element $b_j$ of the second intermediate data $MD_2$ is represented by the following Expression.

$$b_j = \Sigma_{i=1:N} a_{ji}/N$$

Returning to FIG. 17, the second neural network 76 receives the second intermediate data $MD_2$, and generates final data FD that indicates the probability of matching between the object OBJ and each of the multiple kinds (categories). The second neural network 76 may be configured in the same manner as the neural network shown in FIG. 5.

The object identification system 10B supports learning using the first learning method described above. That is to say, the object identification system 10B instructs the first neural networks 72 to learn using multiple items of line data measured for multiple portions of multiple kinds. A common learning result is applied to all the first networks 72_1 through 72_N.

Subsequently, the second neural network 76 is instructed to learn in a state in which the outputs of the first neural networks 72_1 through 72_N after learning are coupled to the second neural network 76 via the combining processing unit 74.

The above is the configuration of the object identification system 10B. Next, description will be made regarding the advantage thereof.

Figure 19:
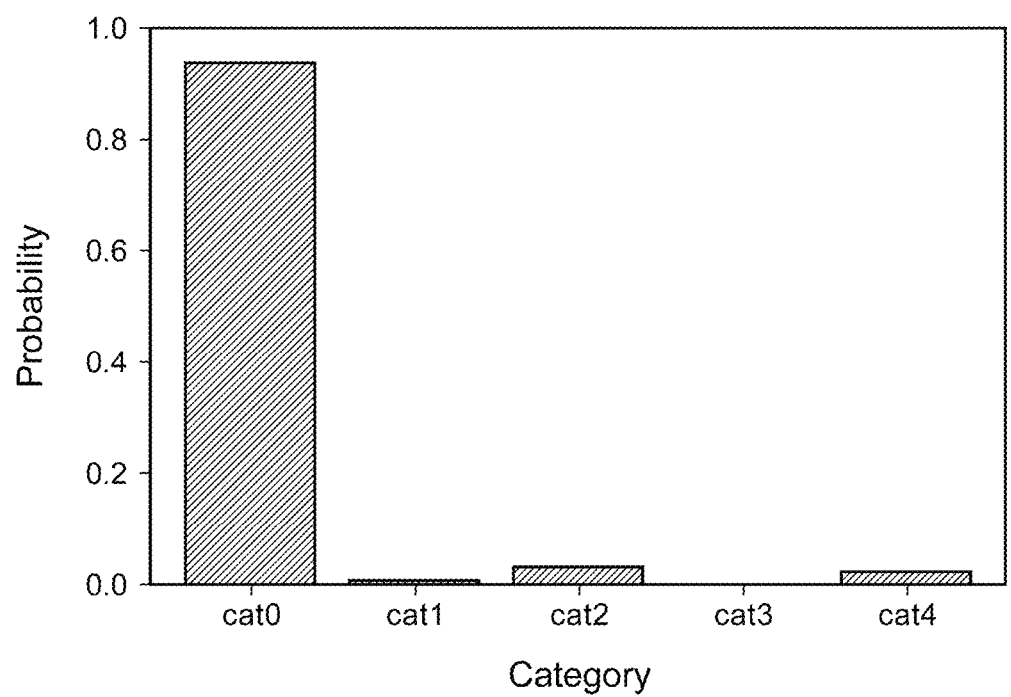
FIG. 19 is a diagram showing final data obtained by the object identification system according to the second embodiment in a situation shown in FIG. 13B.
Figure 20:
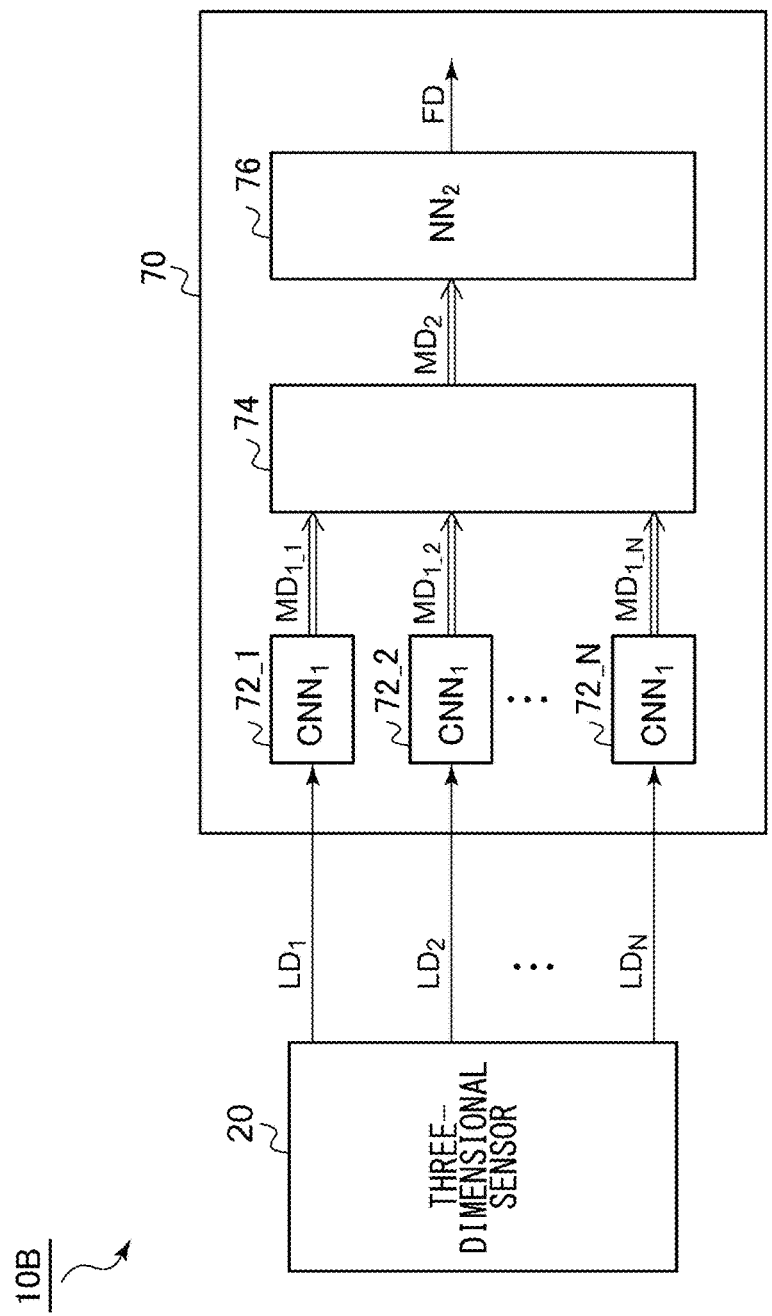
FIG. 20 is a block diagram showing an object identification system according to a modification 3.

FIG. 19 is a diagram showing the final data obtained by the object identification system according to the second embodiment in a situation shown in FIG. 13B. With the second embodiment, such an arrangement allows the probability of the identification of a pedestrian to be raised as compared with the final data shown in FIG. 13C obtained by a combination of the first embodiment and the first learning method.

Next, description will be made regarding modifications relating to the second embodiment.

Modification 1

Description has been made with reference to FIG. 18 regarding an arrangement in which the combining processing unit 74 generates a simple average value. Also, the combining processing unit 74 may generate a weighted average value. Here, "$c_i$" represents the weighting coefficient for each height (line).

$$b_j = \Sigma_{i=1:N} a_{ji} c_i / N$$

Alternatively, the combining processing unit 74 may calculate the sum total.

$$b_j = \Sigma_{i=1:N} a_{ji}$$

Alternatively, the combining processing unit 74 may select the maximum value.

$$b_j = \max(a_{j1}, a_{j2}, \ldots a_{jK})$$

Modification 2

Description has been made with reference to FIG. 17 regarding an arrangement configured to support a single item of second intermediate data $MD_2$. Also, multiple items of second intermediate data may be supported. For example, N items of first intermediate data $MD_{1\_1}$ through $MD_{1\_N}$ may be combined so as to generate two items of second intermediate data $MD_{2\_1}$ and $MD_{2\_2}$. In this case, for example, the multiple items of first intermediate data $MD_{1\_1}$ through $MD_{1\_N}$ may be divided into two groups. The second intermediate data $MD_{2\_1}$ may be generated based on one from among the two groups thus divided. The second intermediate data $MD_{2\_2}$ may be generated based on the other one from among the two groups thus divided.

Modification 3

FIG. 17 is a block diagram showing an object identification system 10C according to a modification 3. In this modification, a convolutional neural network is applied to the object identification system 10B shown in FIG. 17. By employing such a convolutional neural network, such an arrangement allows the robustness to be improved for position deviation of the object in the horizontal direction.

Other Modifications

Description has been made above regarding an arrangement in which the number N of the multiple items of line data is eight. Also, an arrangement may be made in which N is set to a value on the order of 4 to 12 giving consideration to the calculation power of the processing device 40 and the required object OBJ identification capability.

In an embodiment, the object may be defined as a different kind (category) for each orientation as viewed from the user's vehicle. That is to say, the same object is identified as a different kind according to the orientation thereof, e.g., whether or not the object is positioned with a face-to-face orientation with respect to the user's vehicle. This is because such identification is advantageous in estimating the object OBJ moving direction.

The processing device 40 may be configured of only a hardware component using an FPGA or the like.

Description has been made in the embodiment regarding the in-vehicle object identification system 10. However, the present disclosure is not restricted to such an application. For example, the object identification system 10 may be fixedly installed on transportation infrastructure such as a traffic light, traffic sign, or the like. That is to say, the present disclosure is applicable to a fixed-point observation application.

Description has been made regarding the present disclosure with reference to the embodiments using specific terms. However, the above-described embodiments show only an aspect of the mechanisms and applications of the present disclosure. Rather, various modifications and various changes in the layout can be made without departing from the spirit and scope of the present disclosure defined in appended claims.

What is claimed is:

1. An object identification system comprising:
a three-dimensional sensor structured to generate a plurality of items of line data for a plurality of horizontal lines defined with different heights; and
a processing device structured to identify a kind of an object based on the plurality of items of line data,
wherein the processing device comprises:
a plurality of first neural networks each of which is structured to generate first intermediate data relating to a corresponding one from among the plurality of items of line data such that the first intermediate data indicates a probability of matching between the corresponding line data and each of a plurality of portions of a plurality of kinds;
a combining processing unit structured to receive the plurality of items of first intermediate data that corresponds to the plurality of items of line data, and to combine the plurality of items of first intermediate data so as to generate at least one item of second intermediate data; and
a second neural network structured to receive the at least one item of second intermediate data, and generate final data that indicates a probability of matching between the object and each of the plurality of kinds.

2. The object identification system according to claim 1, wherein the number of the at least one item of second intermediate data is one,
and wherein the second intermediate data is obtained based on all the plurality of items of first intermediate data.

3. The object identification system according to claim 2, wherein the at least one item of second intermediate data is an average or a sum total of a predetermined number of corresponding items of first intermediate data.

4. The object identification system according to claim 1, wherein the number of the at least one item of second intermediate data is plural,
and wherein each item of the second intermediate data is obtained based on a predetermined number of consecutive items selected from among the plurality of items of first intermediate data.

5. The object identification system according to claim 1, structured to execute:
instructing the first neural networks to learn using a plurality of items of line data obtained by measuring a plurality of portions of a plurality of kinds; and
instructing the second neural network to learn in a state in which outputs of the plurality of first neural networks after learning are combined to the second neural network via the combining processing unit.

6. The object identification system according to claim 1, wherein the kinds of the object include at least a pedestrian, a person on a bicycle, and a motor vehicle.

7. A motor vehicle comprising the object identification system according to claim 1.

8. The motor vehicle according to claim 7, wherein the three-dimensional sensor is built into a headlamp.

9. An automotive lamp comprising the object identification system according to claim 1.

10. A method for identifying a kind of an object based on a plurality of items of line data obtained by a three-dimensional sensor, the method comprising: generating the plurality of items of line data for a plurality of horizontal lines defined with different heights; generating first intermediate data for each line data such that it indicates a probability of matching between the line data and each of a plurality of portions of a plurality of kinds; combining a plurality of items of first intermediate data obtained for the plurality of items of line data, so as to generate at least one item of second intermediate data; and generating final data based on the at least one item of second intermediate data such that it indicates a probability of matching between the object and each of the plurality of kinds; instructing a plurality of first neural networks to learn using a plurality of items of line data obtained by measuring a plurality of portions of a plurality of kinds; and instructing a second neural network to learn in a state in which outputs of the plurality of first neural networks after learning are combined to the second neural network.

11. A learning method employed in a processing device structured to identify a kind of an object based on a plurality of items of line data obtained by a three-dimensional sensor, wherein the processing device comprises:
a plurality of first neural networks each of which is structured to generate first intermediate data relating to a corresponding one from among the plurality of items of line data such that the first intermediate data indicates a probability of matching between the corresponding line data and each of a plurality of portions of a plurality of kinds;
a combining processing unit structured to receive the plurality of items of first intermediate data that corresponds to the plurality of items of line data, and to combine the plurality of items of first intermediate data so as to generate at least one item of second intermediate data; and
a second neural network structured to receive the at least one item of second intermediate data, and generate final data that indicates a probability of matching between the object and each of the plurality of kinds,
and wherein the learning method comprises:
instructing the first neural networks to learn using a plurality of items of line data obtained by measuring a plurality of portions of a plurality of kinds; and
instructing the second neural network to learn in a state in which outputs of the plurality of neural networks after learning are combined to the second neural network via the combining processing unit.

* * * * *